Sept. 16, 1924.  
I. J. SCALISI  
1,509,032  
PARACHUTE ATTACHMENT FOR AIRSHIPS  
Filed Feb. 18, 1924
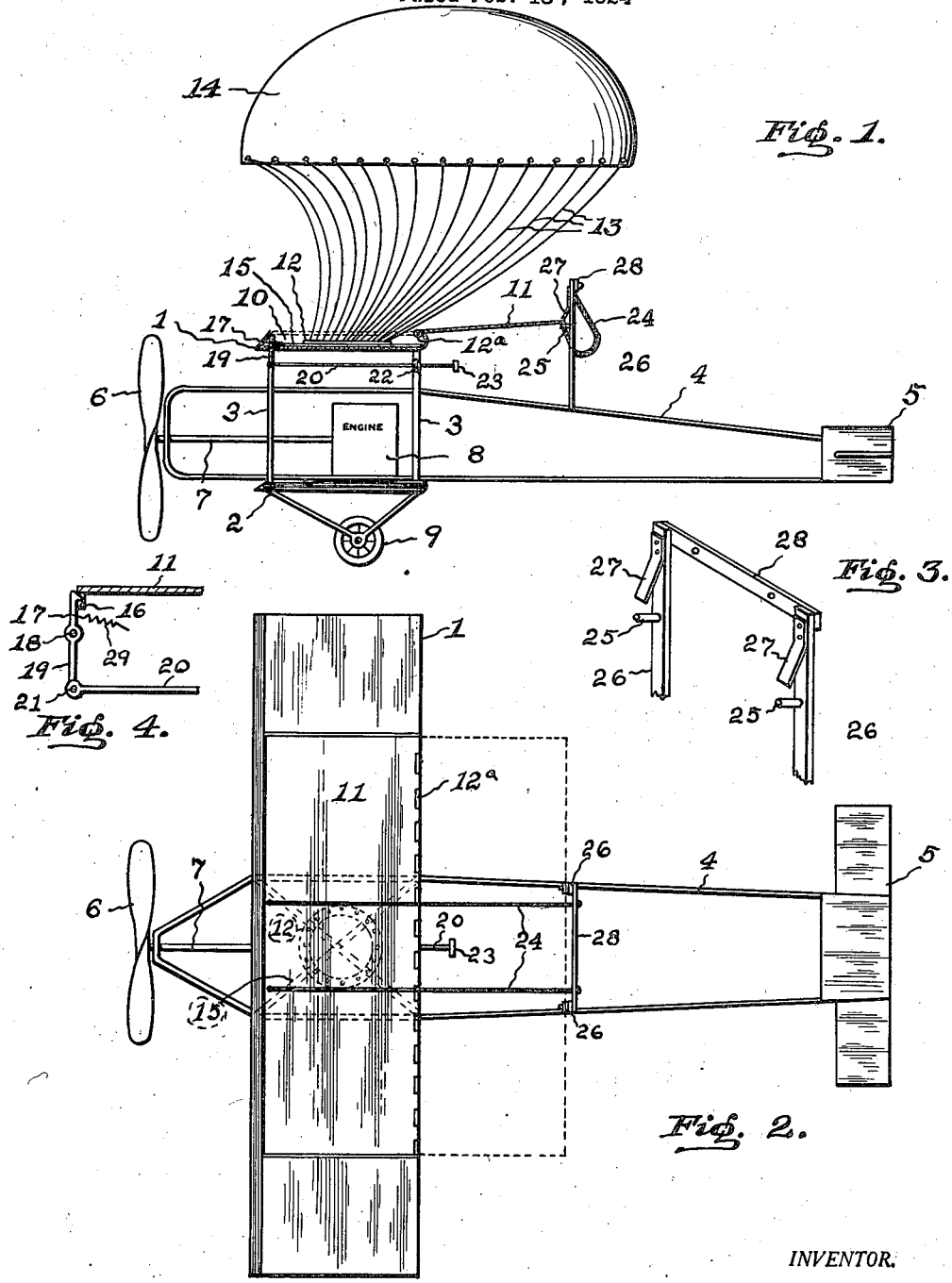
INVENTOR.  
I. J. Scalisi  
BY  
ATTORNEYS Patented Sept. 16, 1924.

1,509,032

UNITED STATES PATENT OFFICE.

IGNAZIO J. SCALISI, OF CLEVELAND, OHIO.

PARACHUTE ATTACHMENT FOR AIRSHIPS.

Application filed February 18, 1924. Serial No. 693,430.

*To all whom it may concern:*

Be it known that I, IGNAZIO J. SCALISI, a citizen of the United States, residing at Cleveland, in the county of Cuyahoga and State of Ohio, have invented certain new and useful Improvements in Parachute Attachments for Airships, of which the following is a specification.

The present invention relates to a parachute for airships, and has for its object to provide a device of this character which embodies novel features of construction, whereby a collapsed parachute which is normally housed in an inoperative position within some part of the airship can be quickly released and permitted to assume an operative position so that a safe landing can be made in the event of an accident to the airship.

Further objects of the invention are to provide a parachute attachment for airships which is comparatively simple and inexpensive in its construction, which can be readily applied to an airship, which will not interfere in any manner with the flight and control of the airship under normal conditions, which can be quickly released in the event of an accident, and which will become distended as soon as released, so that the disabled airship will have a comparatively slow descent and a safe landing can be made.

With the above and other objects in view the invention consists in certain combinations and arrangements of the parts as will more fully appear as the description proceeds, the novel features thereof being pointed out in the appended claims.

For a full understanding of the invention reference is to be had to the following description and accompanying drawings in which, Figure 1 is a side elevation of an airship which is equipped with a parachute attachment constructed in accordance with the present invention, the upper plane being shown in section and the parachute being shown by full lines in operative position.

Figure 2 is a top plan view of an airship with the parts in the position assumed when collapsed and stored in a compartment in the upper plane, the position of the cover for the compartment when swung into an open position being indicated by dotted lines.

Figure 3 is a detail view of the upper portion of the frame which is mounted upon the fuselage of the airship, and is provided with catches for engaging the cover of the parachute compartment to hold the cover in an open position, and Figure 4 is a detail view of the releasable catch or latch which normally holds the cover of the parachute receiving compartment in a closed position.

Corresponding and like parts are referred to in the following description and indicated on all of the views of the drawings by like reference characters.

For the purpose of illustration the invention is shown as applied to a conventional form of airship, although it will be understood that it can be applied to any airship where it is desired to use a safety device of this kind.

Referring to the drawings, the reference numerals 1 and 2 designate the upper and lower planes, respectively, of a heavier than air craft. These planes are connected by the usual uprights 3, and the fuselage 4 extends rearwardly and carries the guiding planes 5. The usual propeller 6 is located at the front of the plane and mounted upon a shaft 7 which is driven by a conventional engine 8. Suitable landing wheels 9 are shown under the airship.

The upper plane 1 of the airship is provided with a compartment 10 which is arranged at the middle portion thereof. The cover 11 for the compartment constitutes a part of the upper surface of the plane and is hinged at the rear edge thereof, as indicated at 12ª, so that it can be readily swung into either an open or a closed position.

Arranged within the compartment is a ring 12 and the cords 13 of the parachute 14 are connected at their lower ends to this ring at various points in the periphery thereof. The ring must be firmly anchored to the frame of the airship, and for this purpose is indicated as secured to diagonal cross bars 15 which extend across the base of the compartment 12 and are secured at their ends to certain of the uprights 3.

When the parachute 14 is collapsed it can be housed within the compartment 10 and the cover 11 swung forwardly so as to close the compartment and hold the parachute in such a position that it does not interfere in any manner with the flight and control of the airship. The cover 11 is provided at the swinging end thereof with a keeper 16 which is adapted to be engaged by the hooked end of a catch 17. This catch is pivoted at 18 upon the body portion of the plane and is shown as provided with a tail portion 19 having a pull rod 20 pivotally connected thereto at 21. This pull rod 20 extends rearwardly, passes through a suitable guide 22, and terminates in a handle or finger piece 23. This handle is adapted to be arranged within convenient reach of the aviator so that in the event of an accident he can pull thereon and move the latch 17 into an inoperative position.

When the cover 11 is released by disengagement of the catch 17 from the keeper 16, a pair of spring cables 24 pull the same rearwardly into an open position. The open position of the cover is indicated by full lines on Figure 1 and by dotted lines on Figure 2. When the cover reaches an open position the edge thereof engages stop members 25 projecting from uprights 26 which are mounted upon the fuselage. These uprights also carry spring detents 27 which yield inwardly to permit the swinging edge of the cover 11 to pass the same, although they afterwards spring outwardly and cooperate with the stop members 25 to lock the cover in an open position.

The upper ends of the uprights 26 are connected by a cross bar 28 and the spring cables 24 are connected at their rear ends to this cross bar. A suitable spring 29 may be utilized for normally holding the catch 17 in operative position. The parachute is normally collapsed and housed within the compartment 10, although in the event of an accident the aviator grasps the handle 23 and pulls rearwardly upon the same, thereby moving the catch 17 into an inoperative position and releasing the cover 11. The spring cables 24 then swing the cover 11 into an open position, whereupon the parachute will be caught by the air currents and caused to become distended and assume an operative position, as indicated by Figure 1. The parachute will then operate in the usual manner to bring about a slow descent of the disabled airship, with the result that a safe landing can be made.

While one particular embodiment of the invention has been illustrated and described in detail, it will be understood that I do not restrict myself to the precise structural details shown, and that many modifications and changes can be made in the structural details without departing from the spirit of the invention.

Having thus described my invention what I claim as new and desire to secure by Letters Patent is:

1. The combination with an airship including a supporting plane having a parachute receiving compartment arranged entirely between the normal surfaces thereof, a cover for the compartment which constitutes one of the surfaces of the plane when in a closed position, a parachute anchor arranged within the compartment and firmly secured to the frame of the airship, a collapsible parachute normally housed within the compartment and attached to the said anchor, and means for opening the cover to release the parachute in an emergency.

2. The combination with an airship including a supporting plane having a parachute receiving compartment formed therein and arranged entirely between the normal surfaces of the plane, a hinged cover for the compartment which is a continuation of and forms a part of the surface of the plane when it is in a closed position, a parachute anchor arranged within the compartment and firmly secured to the frame of the airship a collapsible parachute adapted to be collapsed within the compartment and connected to the anchor member, a spring for swinging the cover into an open position, and quickly releasable means normally holding the cover in a closed position.

3. The combination with an airship provided with a parachute receiving compartment, of a cover for the compartment, a parachute adapted to be collapsed within the compartment, means for opening the cover, and a member projecting from the airship and provided with means for engaging the cover to hold it in an open position.

4. The combination with an aeroplane including a plane having a parachute receiving compartment therein, a cover for the compartment which forms one of the surfaces of the plane when in a closed position, a parachute permanently attached to the aeroplane and adapted to be received within the compartment when in a collapsed condition, means for holding the cover in a closed position, means for releasing the cover, a member projecting from the airship, and a spring cable connecting the cover to the said member and operating to open the cover when the latter is released.

5. The combination with an aeroplane having a fuselage and a plane, the latter being formed with a parachute receiving compartment, a hinged cover for the compartment which forms a surface of the plane when in a closed position, a parachute permanently attached to the aeroplane and adapted to be received within the compartment when collapsed, a latch for holding the cover in a closed position, means for releasing the latch, an upright projecting from the fuselage, a spring means connecting the upright to the cover for swinging the cover into an open position when released, and cover engaging means on the upright.

In testimony whereof I affix my signature.

IGNAZIO J. SCALISI.